United States Patent [19]

Osborne

[11] 4,272,226
[45] Jun. 9, 1981

[54] FLUID PUMP AND METHOD FOR OPERATING SAME

[76] Inventor: Harry E. Osborne, 1246 Fourth Ave. North, Fort Dodge, Iowa 50501

[21] Appl. No.: 1,676

[22] Filed: Jan. 8, 1979

[51] Int. Cl.$^3$ ............................................. F04B 17/04
[52] U.S. Cl. ................................................... 417/418
[58] Field of Search .......................... 417/53, 416–419, 417/350, 397; 310/30, 34, 35

[56] References Cited

U.S. PATENT DOCUMENTS

| | | | |
|---|---|---|---|
| 1,782,975 | 11/1930 | Schaer | 417/397 X |
| 2,061,869 | 11/1936 | Gilbert et al. | 417/418 |
| 2,121,895 | 6/1938 | Toward et al. | 310/35 |
| 2,515,110 | 7/1950 | Bornstein | 417/418 |
| 2,701,331 | 2/1955 | Holst | 417/418 X |
| 3,134,938 | 5/1964 | Morgan | 417/418 X |
| 3,287,616 | 11/1966 | McNeil | 310/35 X |
| 3,305,097 | 2/1967 | Natelson | 417/474 X |
| 3,511,583 | 5/1970 | Brown | 417/474 X |

Primary Examiner—Carlton R. Croyle
Assistant Examiner—Edward Look
Attorney, Agent, or Firm—Zarley, McKee, Thomte, Voorhees & Sease

[57] ABSTRACT

The fluid pump comprises at least one pumping cylinder having a pumping piston mounted therein for reciprocating movement and including an inlet valve and an outlet valve for permitting the entry and exit, respectively, of fluid into the cylinder in response to reciprocating movement of the piston. A piston rod is connected to the pumping piston and extends outwardly from the cylinder where it is connected to a piston made of magnetic material. The magnetic piston is surrounded by a plurality of coils which are controlled for causing sequential actuation of the coils to move the magnetic piston back and forth in an axial direction, thereby causing reciprocating movement of the pumping cylinder. The method for pumping fluid with the pump comprises sequentially actuating different portions of the coils in such a manner that during movement of the piston between its extreme positions only those coils located most closely to the piston will be actuated at any given time.

7 Claims, 4 Drawing Figures

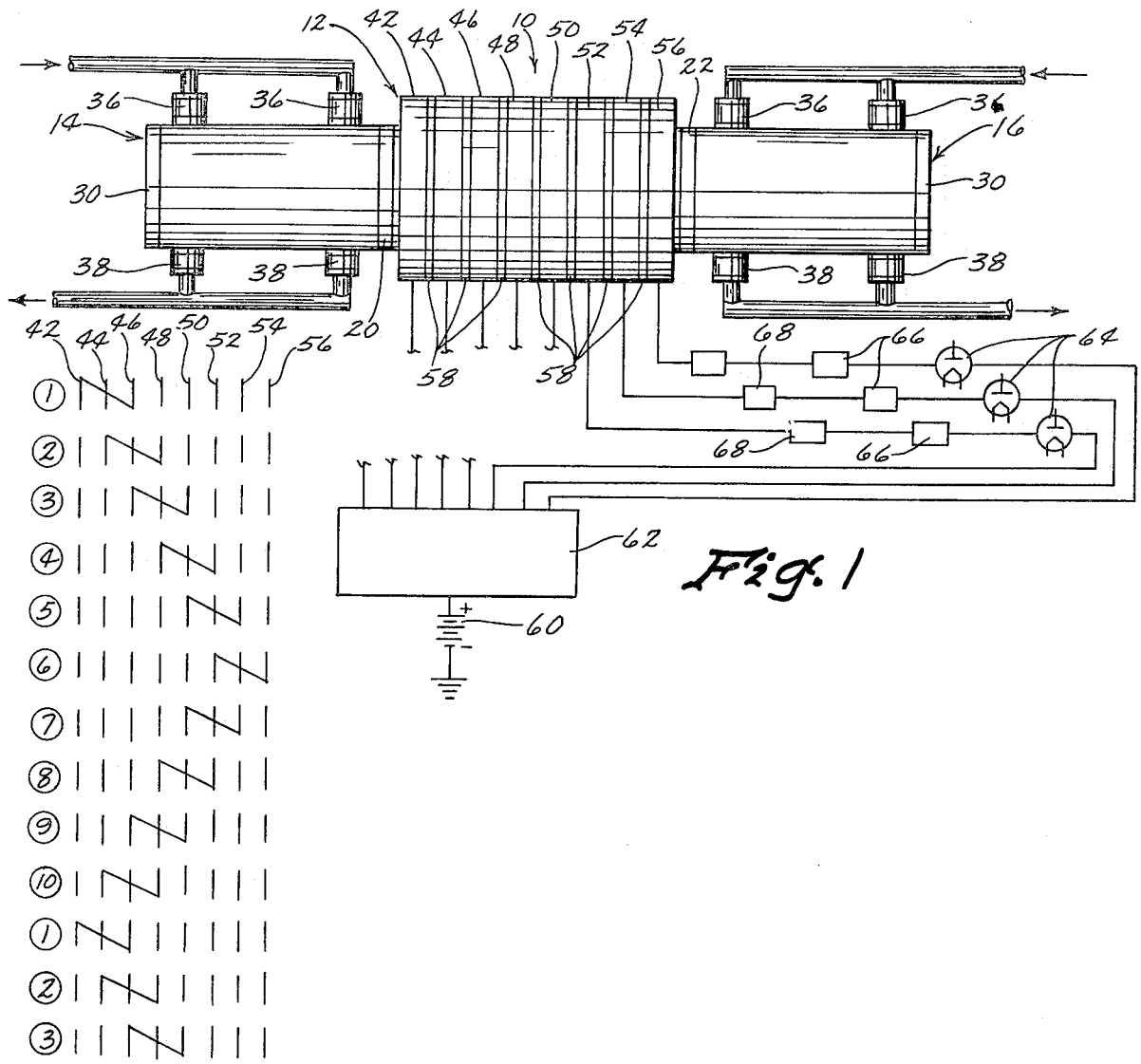
Fig. 1
Fig. 2
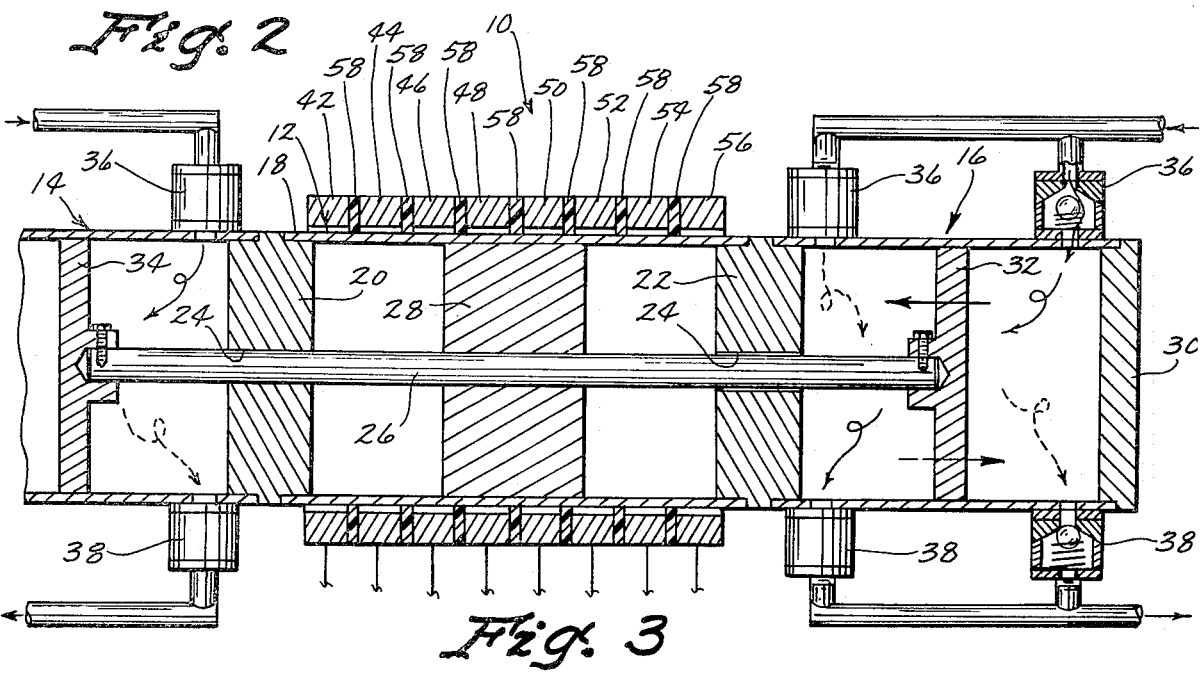
Fig. 3

FLUID PUMP AND METHOD FOR OPERATING SAME

BACKGROUND OF THE INVENTION

This invention relates to fluid pumps and particularly to fluid pumps having reciprocating cylinders driven by electro-magnetic coils.

The primary advantage of such pumps is that the pistons are driven by electro-magnetic coils which surround the pistons, thereby eliminating the need for electrical motors or other driving means. Such pumps usually include a magnetic piston which is surrounded by a single elongated electronic coil. Actuation of the coil causes reciprocation of the piston.

Usually only a single coil is utilized which surrounds the piston. Some pumps have utilized two separate coils located at opposite ends of the pistons's reciprocating path. Both of these arrangements are disadvantageous inasmuch as they do not concentrate the maximum electrical power on the piston during all positions of the piston. Consequently there are spots where the force acting on the piston is weakened and therefore the force is not constant throughout the cycle of the piston.

Another disadvantage of present devices arises from the fact that the coil acts directly upon the piston which is utilized for forcing the fluid through the pump. This arrangement limits the flexibility of the design inasmuch as the size of the piston must be chosen not only to accomplish the proper pumping force, but also to respond properly to the electromagnetic forces emitted by the coil. Thus, in present devices it is difficult to vary the size of the piston without upsetting the delicate balance between the force exerted by the coil and the counteracting force exerted by the fluid within the pump.

SUMMARY OF THE INVENTION

The present invention is capable of running on a direct current power source although it may be adapted for either direct current or alternating current. The reciprocating piston pump includes a piston rod which extends from the pumping cylinder and which is connected to a magnetic piston mounted for reciprocating movement within a master cylinder. The magnetic piston is comprised of a magnetic material and the master cylinder is comprised of a hard steel such as stainless steel which is non-magnetic. Surrounding the master cylinder are a plurality of coils each separately controlled by a control circuit. The control circuit includes a timing decoder which causes sequential actuation of the individual coils in such a manner as to force the magnetic piston back and forth within the master cylinder. Preferably the coils are actuated three at a time, and the timing is coordinated so that the coils which are located closest to the magnetic piston are actuated, thereby concentrating the force at the point where the piston is located and moving the location of the coil force axially along the cylinder in coordination with the reciprocating movement of the piston. The result of the present invention permits the concentration of power at the location of the magnetic piston, thereby keeping the power which is exerted on the magnetic piston constant throughout the piston's stroke. The speed at which the magnetic piston is driven can be varied by changing the electronic stepping decoder to achieve the desired speed. The concentration of the electromagnetic forces at the point where the piston is located maximizes the power which can be applied to the piston.

Furthermore, the fact that the magnetic piston is in a master cylinder separate from the pumping piston, permits the size and shape of the magnetic piston to be selected solely on the basis of maximizing the force exerted on the piston in response to the coils. The size of the magnetic piston can be different from the size or diameter of the pumping piston, thereby permitting various power ratios to be achieved, and this feature is not available on presently known pumps wherein the coils act directly upon the pumping piston.

The pump of the present invention may be utilized in numerous applications. For example, it could be used to drive an air conditioner pump in a vehicle. It also could be used to compress air or hydraulic fluid for driving a pneumatic or hydraulic motor which in turn could be connected to various types of machines. The present pump is small in size and is portable, particularly when utilized with a direct current source. There are a minimum number of moving parts in the present invention compared to other types of pumps.

Another advantage achieved with the present invention is the safety of operation in environments which are likely to be combustible. The use of conventional electrical motors to drive pumps is a dangerous practice in areas where gasoline fumes or other highly combustible substances are located. The present invention, however, does not utilize an armature, but merely utilizes coils surrounding a reciprocating piston. Thus, the danger of sparks is substantially less with the pump of the present invention than with other types of pumps.

Therefore, a primary object of the present invention is the provision of an improved fluid pump and method for operating same.

A further object of the present invention is the provision of a fluid pump which includes a magnetic piston separate from the pumping piston so that the size of the magnetic piston may be different from the size of the pumping piston.

A further object of the present invention is the provision of a fluid pump which includes a plurality of coils each of which is actuated at different times so as to concentrate the maximum force at the location of the piston during its reciprocating movement.

A further object of the present invention is the provision of a fluid pump which keeps constant power on the magnetic piston during its stroke cycle.

A further object of the present invention is the provision of a pump which includes a master piston and cylinder which may be connected to a plurality of pumping pistons.

A further object of the present invention is the provision of a fluid pump wherein the speed of pumping may be varied easily.

A further object of the present invention is the provision of a fluid pump wherein the dimensions of the master cylinder and the pump cylinders may be varied to achieve a plurality of power ratios.

A further object of the present invention is the provision of a fluid pump which may be utilized either with alternating current or direct current, and which is substantially free of sparks.

A further object of the present invention is the provision of a fluid pump which is portable and safe and of minimum size.

A further object of the present invention is the provision of a fluid pump which has a minimum of moving parts.

A further object of the present invention is the provision of a fluid pump which is economical to manufacture, durable in use, and efficient in operation.

BRIEF DESCRIPTION OF THE DRAWINGS

FIG. 1 is a plan view of the fluid pump showing schematically the electrical circuitry which is connected to the various cylinder coils.

FIG. 2 is a schematic diagram illustrating the actuation cycle of the eight coils.

FIG. 3 is a longitudinal sectional view of the fluid pump.

DETAILED DESCRIPTION OF THE DRAWINGS

Figure 4:
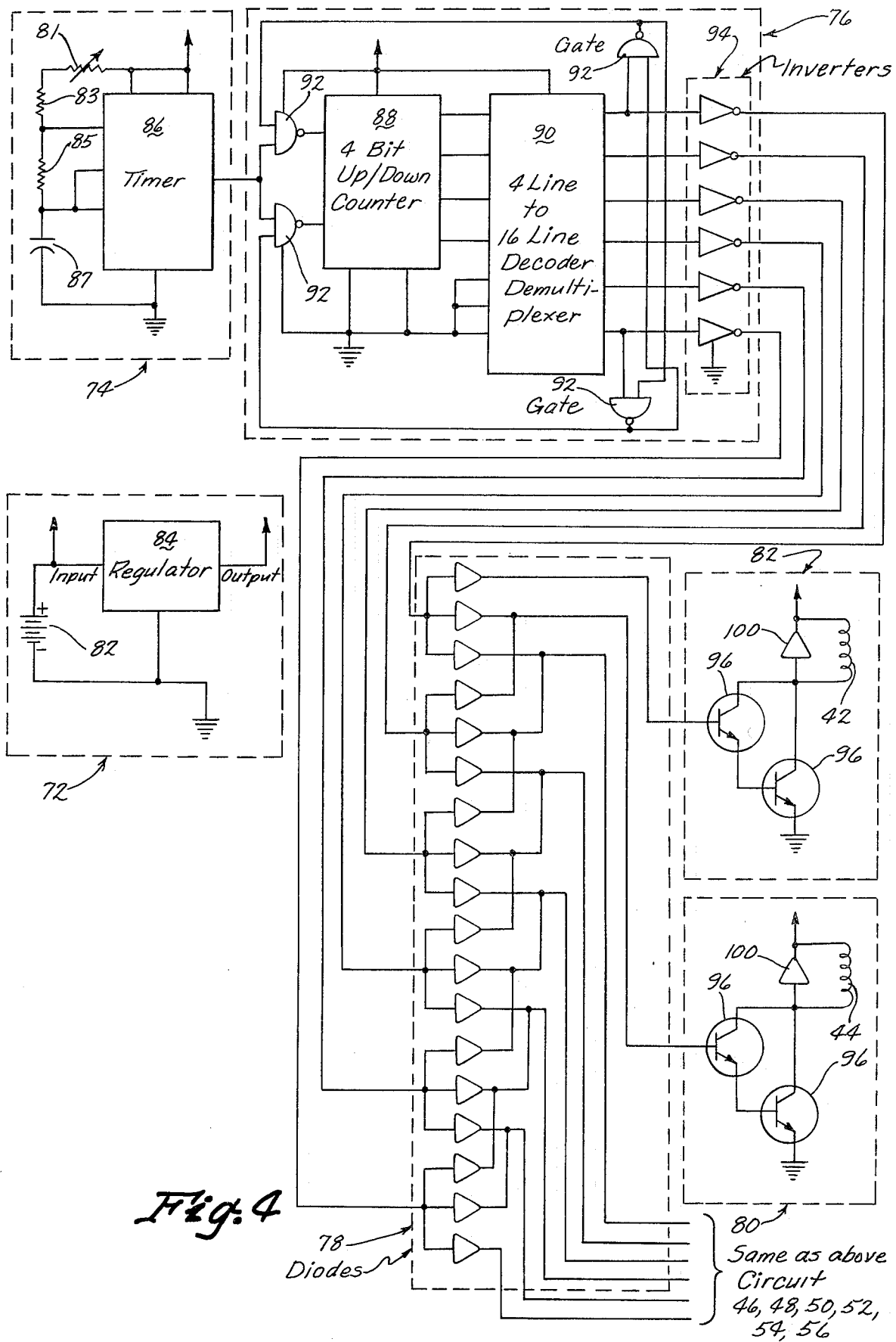
FIG. 4 is a schematic diagram of a modified form of electrical circuitry for actuating the various cylinder coils.

Referring to the drawings, numeral 10 generally designates the fluid pump of the present invention. Pump 10 comprises a master cylinder 12 and two pumping cylinders 14, 16.

Master cylinder 12 comprises a cylindrical tube 18 comprised of stainless steel or some other non-magnetic substance which is essentially dielectric in nature. Closing the opposing ends of tube 18 are a pair of blocks or glands 20, 22 which form end closures for the opposite ends of tube 18. Extending centrally through each block or gland 22 is a sleeve bearing 24 for receiving a piston rod 26.

Slidably mounted within tube 18 is a magnetic piston 28 which is comprised of permanent magnetic material. Piston 28 is attached in fixed relation to piston rod 26 so that reciprocating movement of piston 28 within cylinder 18 causes similar reciprocating movement of piston rod 26.

Pumping cylinders 14, 16 are connected to the opposite ends of master cylinder 12. Block 20 forms an end closure for pumping cylinder 14 and block 22 forms an end closure for pumping cylinder 28. The outer ends of cylinders 14, 16 each include an enclosure member 30. Cylinders 14, 16, end closures 30, blocks 22, piston rod 26, and master cylinder 18 are all constructed of dielectric material such as stainless steel or the like.

Mounted within pumping cylinder 16 is a pumping piston 32, and mounted within cylinder 14 is a similar pumping piston 34, each of which is fixed to one of the opposite ends of piston rod 26. Thus, reciprocating movement of magnetic cylinder 28 causes corresponding reciprocating movement of pistons 32, 34.

Each piston 14, 16 is provided with a pair of one-way inlet valves 36 and one-way outlet valves 38. This arrangement of valves creates a dual action within each of cylinders 14, 16 whereby reciprocating movement of pistons 32, 34 causes fluid to be drawn in through inlet valves 36 and to be forced outwardly through outlet valves 38.

Surrounding master cylinder 18 is a coil assembly 40 comprising a plurality of individual coils 42–56. Coils 42–56 are separated by dielectric spacers 58.

Means for actuating coils 42–56 are provided by a direct current power source 60 which in turn is connected to a clock decoder system 62, such as that sold by Tandy Corporation under the model designation No. 7447-7 (Radio Shack No. 276-1805), a 16 pin dual in-line unit that provides a sequenced firing circuit.

Leading from the decoder are eight separate lines which are connected to coils 42–56. Each line includes therein a diode 64, an emitter 66, and a transistor 68. Emitter 66 is preferably an NPN silicone transistor designated by the number 276-2016 by Radio Shack, a division of Tandy Corporation, Fort Worth, Tex. 76102. The transistor 68 is preferably an NPN power transistor sold under the designation 276-2039 by the foregoing corporation.

The decoder 62 causes electricity from battery 60 to be directed to individual coils in a stepping sequence. Preferably the sequence is arranged so that three coils are actuated simultaneously. FIG. 2 illustrates the actuation cycle of the various coils 42–56. The various steps are designated by the numerals 1 through 10 at the left of FIG. 2. The diagonal cross mark on each step indicates the three cylinders which are actuated at any given time. During the return stroke in steps 6 through 10, the polarity of the coils is reversed from the first half of the stroke in steps 1 through 5. This causes the magnetic piston 28 to be driven first in one direction and then in the opposite direction in reciprocating fashion so as to cause reciprocating movement of pistons 32, 34.

While eight coils are shown in the drawings, the number of coils may be increased or decreased without detracting from the invention. The importance of the present stepping actuation of the coils is that it permits the coils immediately adjacent piston 28 to be actuated, thereby concentrating the electromagnetic forces at the location of the piston at all times so as to insure maximum power being applied to the piston. Furthermore, the power applied to the piston is constant throughout its stroke, whereas in previous devices the stroke often includes weak spots.

The system described above will result in 20 cycles per second of piston travel. However, if desirable, more coils could be used to further increase the performance of the machine. The leverage is applied where the master cylinder is separate from the pumping cylinders, thereby resulting in greater pressure. This type of pump may be used both as a high pressure pump for hydraulic fluid or for gases such as air or freon.

When each unit is fully assembled, the phenolic spacers 58 will be placed between the coils to hold them in position. A cover of metal (not shown) which may be made of some non-conductor, may be used to cover the center coils of the machine to insure a moisture and soil proof protection for the coils.

Referring to FIG. 4, a modified form of electrical circuitry is shown schematically for actuating the various coils 42, 44, 46, 48, 50, 52, 54, 56. The circuit of FIG. 4 includes a power circuit 72, a timing circuit 74, a counting and decoding circuit 76, a diode matrix circuit 78 and a plurality of output circuits 80.

The power from a 12 volt battery 82 is regulated by a voltage regulator 84 to +5 volts for supply voltage to the integrated circuits.

Timer circuit 74 includes a timer 86 which is connected as an astable multi-vibrator. The operating frequency of the timer's output is controlled by the other resistors and capacitors as shown in the circuit.

The output from the timer is fed to a 4 bit up/down counter designated by the numeral 88. The counter's outputs are fed into a four line to 16 line decoder/demultiplexer 90. This device is capable of turning on one of 16 different outputs according to the binary input feed to it from the up/down counter 88. Out of these 16 outputs, only 6 are used. The back and forth motion for the power coils is accomplished by a gate 92. When the output reaches its highest or lowest limit it gates to either the up or down inputs of counter 88, thereby changing the direction of the count to the decoder/multiplexer 90. The outputs of the decoder/multiplexer 90 are inverted by a series of inverters designated by the numeral 94.

The output from counting and decoding circuit 76 then proceeds to diode matrix circuit 78 which are connected together in such a manner to cause three coils to fire at the same time in the patterns shown in FIG. 2 of the drawings. Connected to the output of diode matrix 78 are 8 separate output circuits 80 which turn on the corresponding coil 42, 44, 46, 48, 50, 52, 54, or 56.

The preferred components for use in the circuit shown in FIG. 4 are manufactured and sold by the Radio Shack Division of Tandy Corporation under the following model designations:

| | |
|---|---|
| Voltage regulator 84: | Model No. 276-1770 |
| Variable Resistor 81: | Model No. 271-0903 |
| Resistor 83: | Model No. 271-035 |
| Resistor 85: | Model No. 271-035 |
| Capacitor 87: | Model No. 272-1402 |
| Timer 86: | Model No. 276-1723 |
| Up/down counter 88: | Model No. 276-1936 |
| Decoder/demultiplexer: | Model No. 276-1834 |
| Gates 92: | Model No. 276-1900 |
| Inverters 94: | Model No. 276-2449 |
| Diodes for diode matrix 78: | Model No. 276-1122 |
| Transistors 96: | Model No. 276-2039 |
| Diode 100: | Model No. 276-1141 |

As it can be seen the device accomplishes at least all of its stated objectives.

What is claimed is:

1. A fluid pump comprising:
   at least one pumping cylinder having a pumping piston mounted for reciprocating movement therein, at least one inlet valve being provided in said pumping cylinder for permitting entry of fluid into said pumping cylinder in response to movement of said pumping piston in a first direction and at least one outlet valve being provided in said pumping cylinder for permitting exit of fluid in response to movement of said pumping piston in the opposite direction;
   a magnetic piston,
   a piston rod interconnecting said magnetic piston and said pumping piston for causing them to reciprocate in unison in said first and second directions;
   a plurality of separate coils positioned in side by side registered alignment and in surrounding relationship to said magnetic piston;
   electrical power means for actuating said coils to cause axial movement of said magnetic piston;
   control means connected electrically between said power means and said separate coils for causing sequential actuation of said separate coils to move said magnetic piston back and forth in an axial direction, thereby causing reciprocating movement of said pumping cylinder;
   said coils in combination forming a coil cylinder having an axial length greater than that of said magnetic piston whereby only a portion of said coils are located immediately radially outwardly from said magnetic piston for any given position of said magnetic piston,
   said control means comprising a clock decoder circuit for causing electricity from said electrical power source to be directed to only a portion of said separate coils at one time in a stepping sequence wherein those of said coils located adjacent said magnetic piston are actuated throughout reciprocating movement of said magnetic piston;
   said clock decoder circuit comprises a timing circuit, and a counting and decoding circuit, said control means further comprising a diode matrix circuit connected to said clock decoder circuit, and a plurality of output circuits each of which is electrically connected to one said separate coils.

2. A pump according to claim 1 comprising a second pumping cylinder identical to said first mentioned pumping cylinder and having an identical pumping piston, inlet valve and outlet valve, said piston rod being also connected to said pumping piston of said second pumping cylinder whereby actuation of said coils causes reciprocation of said magnetic cylinder and consequential reciprocation of said pumping pistons in both of said first and second pumping cylinders.

3. A pump according to claim 2 wherein a third cylinder surrounds said magnetic piston for guiding said reciprocating movement thereof, said third cylinder being comprised of nonmagnetic material and being surrounded by said coils.

4. A pump according to claim 3 wherein said third cylinder is positioned in axial alignment with said first and second pumping cylinders, each of said pumping cylinders having a partition wall forming an end closure for said pumping cylinder and having an opening therein for receiving said piston rod, sealing means within said opening for permitting reciprocating sliding movement of said rod while at the same time sealing said opening to prevent escape of fluid from said pumping cylinder.

5. A pump according to claim 4 wherein said third cylinder is positioned between said first and second pumping cylinders, said piston rod extending axially from the opposite axial ends of said magnetic piston, said partition walls of said first and second pumping cylinders also forming end closures for said third cylinder.

6. A pump according to claim 1 wherein said timing circuit includes a variable resistor therein for adjusting the frequency of reciprocation of said magnetic piston.

7. A fluid pump comprising,
   at least one pumping cylinder having a pumping piston mounted for reciprocating movement therein, at least one inlet valve being provided in said pumping cylinder for permitting entry of fluid into said pumping cylinder in response to movement of said pumping piston in a first direction and at least one outlet valve being provided in said pumping cylinder for permitting exit of fluid in response to movement of said pumping piston in the opposite direction;
   a magnetic piston;
   a piston interconnecting said magnetic piston and said pumping piston for causing them to reciprocate in unison in said first and second directions;
   a plurality of separate coils positioned in side by side registered alignment and in surrounding relationship to said magnetic piston;

electrical power means for actuating said coils to cause axial movement of said magnetic piston;

control means connected electrically between said power means and said separate coils for causing sequential actuation of said separate coils to move said magnetic piston back and forth in an axial direction, thereby causing reciprocating movement of said pumping cylinder, said coils in combination forming a coil cylinder having an axial length greater than that of said magnetic piston whereby only a portion of said coils are located immediately radially outwardly from said magnetic piston for any given position of said magnetic piston, said control means comprising a clock decoder circuit for causing electricity from said electrical power source to be directed to only a portion of said separate coils at one time in a stepping sequence wherein those of said coils located adjacent said magnetic piston are actuated throughout reciprocating movement of said magnetic piston, said clock decoder circuit having a plurality of electrical lines connected thereto, each of said lines being connected to one of said separate coils and comprising a diode, an NPN emitter, and an NPN power transistor connected in series.

* * * * *